United States Patent [19]

Wettlaufer

[11] Patent Number: 5,207,152
[45] Date of Patent: May 4, 1993

[54] COMPACT JUICE MACHINE

[76] Inventor: Dale E. Wettlaufer, 7930 Clinton St., Elma, N.Y. 14059

[21] Appl. No.: 783,762

[22] Filed: Oct. 28, 1991

[51] Int. Cl.$^5$ .................... A23N 1/02; B30B 9/06; B30B 15/16
[52] U.S. Cl. ........................ 99/510; 99/495; 99/513; 100/96; 100/116; 100/123; 100/131; 241/101.2; 241/277
[58] Field of Search ............ 99/495, 509–513; 241/101.2, 277; 100/48, 49, 53, 94–97, 122, 116, 123, 127, 131, 130, 211, 269 A

[56] References Cited

U.S. PATENT DOCUMENTS

| | | | |
|---|---|---|---|
| 1,131,032 | 3/1915 | Berrigan | 100/123 |
| 1,456,257 | 5/1923 | Stevenson | 100/123 |
| 1,539,161 | 5/1925 | Columbro | 100/96 |
| 1,698,613 | 1/1929 | Van Duzer | 100/96 |
| 2,055,871 | 9/1936 | Manning | 100/122 |
| 2,068,013 | 1/1937 | Fridlender et al. | 100/96 |
| 2,087,435 | 7/1937 | Hubbert | 241/101.2 |
| 2,409,497 | 10/1946 | Kessel | 100/96 |
| 2,417,564 | 3/1947 | Newman | 100/94 |
| 2,550,895 | 5/1951 | Weismueller | 99/510 |
| 2,610,574 | 9/1952 | Winson | 100/96 |
| 2,720,161 | 7/1955 | Kammer | 100/53 |
| 3,032,087 | 5/1962 | Rodwick | 241/92 |
| 4,191,103 | 3/1980 | Wettlaufer | 100/123 |
| 4,267,770 | 5/1981 | Reiner | 100/116 |
| 4,303,011 | 12/1981 | Reiner | 100/122 |
| 4,610,398 | 9/1986 | Palazzolo | 241/92 |
| 4,614,153 | 9/1986 | Kurome et al. | 99/511 |
| 4,680,808 | 7/1987 | Paleschuck | 100/122 |
| 4,688,478 | 8/1987 | Williams | 99/513 |
| 4,892,665 | 1/1990 | Wettlaufer | 100/37 |
| 5,031,524 | 7/1991 | Wettlaufer | 100/48 |

FOREIGN PATENT DOCUMENTS

3720928 1/1989 Fed. Rep. of Germany ........ 99/513
131057 4/1929 Switzerland ..................... 99/513

Primary Examiner—Timothy F. Simone
Attorney, Agent, or Firm—John C. Thompson

[57] ABSTRACT

A compact juice machine (10) of simplified design, the individual elements being simplified to a bare minimum in an easily cleanable package. The machine includes a frame having spaced apart side walls (14, 16) which support front and intermediate rigid platen walls (18, 20) and an upper wall (22) to the rear of the intermediate wall. A press chamber (24) is defined by the forward portion of the side walls and the platen walls. A shredder assembly (36) including a rotatable disk (44) is mounted above the upper wall and a drive motor (48) is mounted below the upper wall, the drive motor having a drive shaft (54) coupled to the shredder disk. A hopper (34) is mounted on the upper wall above the shredder disk. A press chamber cover (38) extends over the press chamber, the cover being provided with a discharge chute (112, 114, 116) on its lower surface to direct shredded material from the shredder disk to the press chamber. A moveable platen (28) is disposed within the press chamber, and a pair of hydraulic cylinder assemblies (142, 144) are connected to the moveable platen. A filter bag assembly (32) is used having first and second spaced apart pulp receiving portions (162, 164) and an intermediate saddle portion (166) capable of being supported by the upper surface (126) of the movable platen. A filter assembly (40) is carried by the frame below the press chamber for additionally filtering juice. The compact juice machine further includes an electrical controller (42) for controlling the operation of the hydraulic cylinder assembly and the shredder.

16 Claims, 5 Drawing Sheets

COMPACT JUICE MACHINE

TECHNICAL FIELD

The present invention relates generally to a machine of the type which is used for shredding or grating fruits or vegetables and for pressing juice from the shredded pulp, and more particularly to a compact juice machine which may be used in supermarkets and the like for shredding fruits and vegetables and for pressing the juice from the shredded pulp, which machine may shred and press at the same time.

BACKGROUND OF THE INVENTION

Various machines have been developed for pressing juice from vegetables and fruit. In recently issued U.S. Pat. No. 5,031,524 a combined grater and press is disclosed which utilizes a single press bag in which the fruit pulp is pressed. This unit combines all of the elements of feeding, shredding, pressing, pomace disposal, juice filtration and dispensing, which elements can all be accomplished in one sanitary unit. Thus, the unit can be placed in a retail store and live up to design criteria of the National Sanitation Foundation. While the foregoing machine preformed in a satisfactory manner, it required a 1 ½ horsepower motor due to the high energy requirements of the shredder. This in turn required that the machine be connected to a 220 volt circuit within the store. In addition, the foregoing machine was relatively noisy and occupied more floor space than was absolutely necessary. Because foregoing machine had only a single press bag, it was necessary to stop the grating of the fruits or vegetables during pressing, and it was necessary to stop pressing during shredding.

A prior double filter cloth press is known from U.S. Pat. No. 4,303,011. In this design an intermediate fixed platen is provided, there being filter cloths to either side of the fixed platen. A pair of movable platens pressed the filter cloth against the fixed platen. This prior machine did not incorporate a shredder or grater, used open bottom filter sleeves requiring that the bags be shaken in the press, and required the use of press aids which gave the juice an off taste.

Many other designs are known from the prior art but none have achieved the desired simplicity of operation, low power and noise requirements, minimal floor space, and have been able to meet the design criteria of the National Sanitation Foundation.

OBJECTS AND SUMMARY OF THE INVENTION

It is an object of the present invention to provide a compact juice machine of simplified design wherein the individual elements are condensed to a bare minimum in an easily cleanable package which can pass current National Sanitation Foundation design criteria and which can be completely enclosed during operation.

The present embodiment discloses two filter bags thereby shrinking size and weight to a level more consonant with present supermarket requirements. The present invention enables pressing and shredding to take place at the same time. In addition, the present machine has lower energy requirements.

In accordance with one aspect of the present invention, a compact juice machine is provided having a hopper, shredder means in communication with the hopper for shredding vegetables or fruit received from the hopper, press means capable of continuously pressing the fruit or vegetable pulp received from the shredder means, and filter means for filtering juice from any large pieces of pulp which may have been discharged with the juice from the press means. The press means the present invention includes a moveable platen structure disposed within a press chamber formed by two spaced apart generally vertically extending rigid platen walls and a pair of fixed side walls, the moveable platen structure including opposed side-to-side extending platen surfaces and an upper surface extending between the opposed platen surfaces. A filter bag assembly is used having first and second spaced apart pulp receiving portions and an intermediate saddle portion capable of being supported by the upper surface of the moveable platen. Platen moving means are provided for reciprocating the moveable platen structure towards and away from the rigid platen walls of the press chamber.

In accordance with another aspect of the present invention, a vegetable or fruit shredder assembly is provided which includes a shredder disk mounted for rotation a short distance below the bottom of a hopper, and a shredder element mounted on the disk, the shredder element having a generally vertically extending edge surface which extends upwardly from the upper surface of the shredder disk approximately 0.8–4 millimeters. The shredder assembly further includes drive means capable of rotating the shredder disk at such a rotational speed as to impart a shredder element tip speed of between 40–70 miles per hour.

In accordance with a further aspect of the present invention, a filter assembly is provided for filtering juices from fruit or vegetable pulp. The filter assembly includes a juice receiving receptacle having an outlet at the bottom of the receptacle, the outlet being circular in cross section. A generally cylindrical support through which juices may flow is provided, a filter sock being pulled over the generally cylindrical support. The parts are so arranged and constructed that one end of the cylindrical support may be partially telescoped into the outlet at the bottom of the receptacle with a substantial portion of the support and the filter sock being disposed within the juice receiving receptacle.

A still further aspect of this invention relates to the construction of a compact juice machine wherein a frame is provided which may be mounted on a mobile stand. The frame has spaced apart side walls which in turn support front and intermediate rigid platen walls, there being an upper wall extending between the side walls to the rear of the intermediate wall. A press chamber is defined by the forward portion of the side walls and the platen walls. A shredder assembly is supported by the frame, the shredder assembly including a rotatable shredder disk mounted above the upper wall and a drive motor mounted below the upper wall, the drive motor having a drive shaft which extends through a bearing seal in the upper wall, the shaft being in turn coupled to the shredder disk. A hopper is mounted on the upper wall above the shredder disk. A press chamber cover extends over the press chamber, the cover being provided with a discharge chute on its lower surface to direct shredded material from the shredder disk to the press chamber. A moveable platen is disposed within the press chamber, and a pair of hydraulic cylinder assemblies are mounted below the upper wall of the frame, each cylinder assembly including a piston rod which extends through a rod bearing seal in the intermediate platen wall, the forward end of each rod being connected to the moveable platen. A filter assembly is carried by the frame below the press chamber for filtering juice from any large pieces of pulp which may have been discharged with the juice from the press means. The compact juice machine further includes electrical control means for controlling the operation of the hydraulic cylinder assembly during operation of the shredder means.

The foregoing structure will be more fully understood after a consideration of the following detailed description taken in conjunction with the accompanying drawings in which a preferred form of this invention is illustrated.

DETAILED DESCRIPTION

In General

Figures 1, 2, 3, 4:
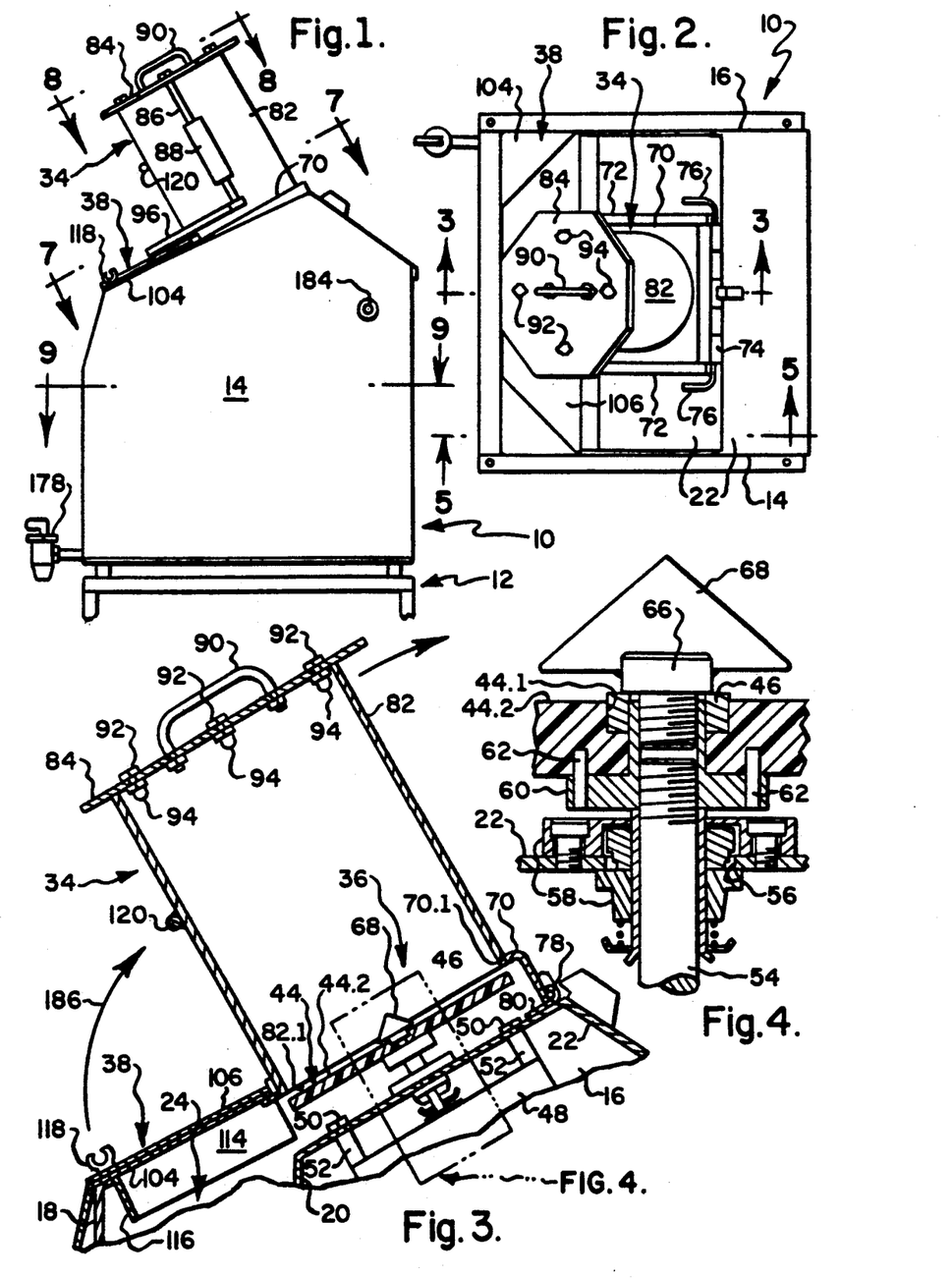
FIG. 1 is a side view of the compact juice machine of this invention.
FIG. 2 is a top view of the structure shown in FIG. 1.
FIG. 3 is an enlarged sectional view taken generally along the line 3—3 in FIG. 2.
FIG. 4 is an enlarged detail of a portion shown in FIG. 3.
Figure 7:
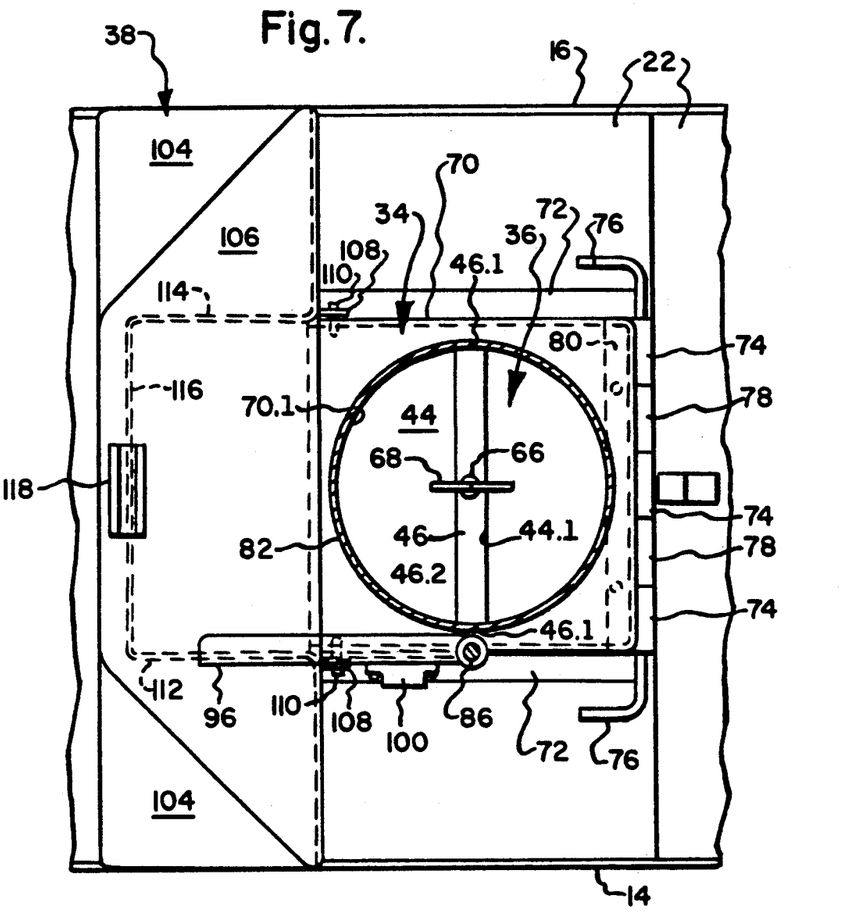
FIG. 7 is an enlarged sectional taken generally along the line 7—7 in FIG. 1.
Figure 8:
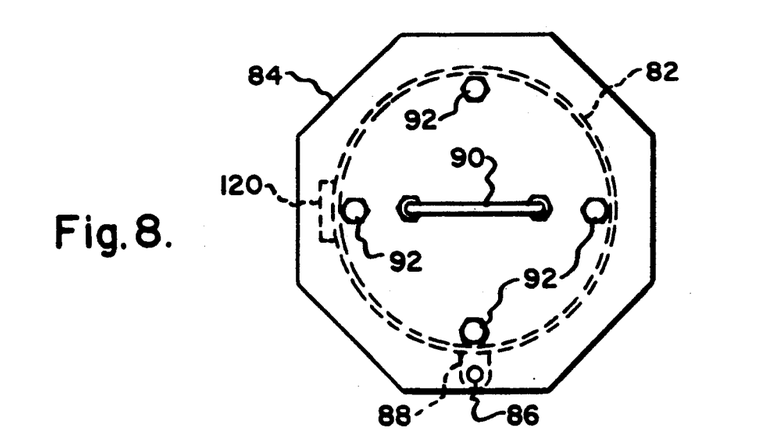
FIG. 8 is an enlarged view of the upper hopper cover shown in FIG. 1, this view being taken generally along the line 8—8 in FIG. 1.

The compact juice machine of this invention, which is indicated generally at 10 in FIG. 1, is adapted to be placed upon a mobile stand indicated generally at 12 in FIG. 1. While only a portion of the mobile stand is illustrated, it should be appreciated that the mobile stand will include one or more shelves and will be supported by castors for movement upon the floor. The mobile stand permits movement of the compact juice machine from a use area within a retail food establishment to a cleanup area where various components of this machine may be readily washed. In the following description right hand and left hand reference is determined by facing the front of the machine, shown to the left in FIGS. 1, 5 and 7. Various components of the compact juice machine are formed either as part of the frame of the machine or are mounted upon the frame, the frame including right and left vertical side walls 14, 16, respectively, and front and intermediate fixed platen walls 18, 20, respectively, the platen walls being rigidly secured to the sidewalls 14 and 18. In addition, the frame includes an upper wall 22 disposed between the side walls and to the rear of the intermediate platen wall 20. All parts of the frame which may come into contact with the product are made of 300 series stainless steel components in order to meet the design criteria of the National Sanitation Foundation. As can be seen from FIGS. 3 and 5, the intermediate platen wall 20 and the upper wall 22 may be formed from a single piece of stainless steel. The front and intermediate platen walls 18 and 20, as well as the right and left side walls 14 and 16 between the platen walls 18 and 20, form a press chamber indicated generally at 24. The press chamber 24 is a portion of the press means, which is indicated generally at 26, the press means further including a moveable platen structure indicated generally at 28, the moveable platen structure being mounted within the press chamber for movement towards and away from the platen walls 18, 20. To this end, platen moving means are provided, the platen moving means including two spaced apart hydraulic cylinder assemblies indicated generally at 30. A filter bag assembly, indicated generally at 32, is also disposed within the press chamber.

Other major components of the compact juice machine of this invention include a hopper assembly indicated generally at 34, a vegetable or fruit shredder assembly indicated generally at 36, a press chamber cover indicated generally at 38, and a filter assembly indicated generally at 40, the filter assembly being mounted below the press chamber. Control means 42 are provided for controlling the operation of unit. The various components set forth above will now be described in greater detail.

Shredder Assembly

The vegetable or fruit shredder assembly 36, which is also referred to as the shredder means, includes as its major components a shredder disk 44 and a shredder 46 mounted on the shredder disk, both the shredder disk and the shredder being driven by drive means in the form of an electric motor 48. The electric motor may be mounted in any conventional manner to the upper wall 22, such as by bolts 50 and spacers 52. The motor 48 is provided with an output or drive shaft 54 which passes through a suitable aperture 56 in the upper wall 22. A shaft seal 58 is disposed about the output shaft 54 and the aperture 56. A drive hub 60 is secured about the upper end of the output shaft 54 for rotation therewith, the drive hub being provided with spaced apart drive pins 62. The shredder disk 44 is provided with spaced apart holes on its lower surface for the reception of the drive pins 62.

Figures 14, 15, 16:
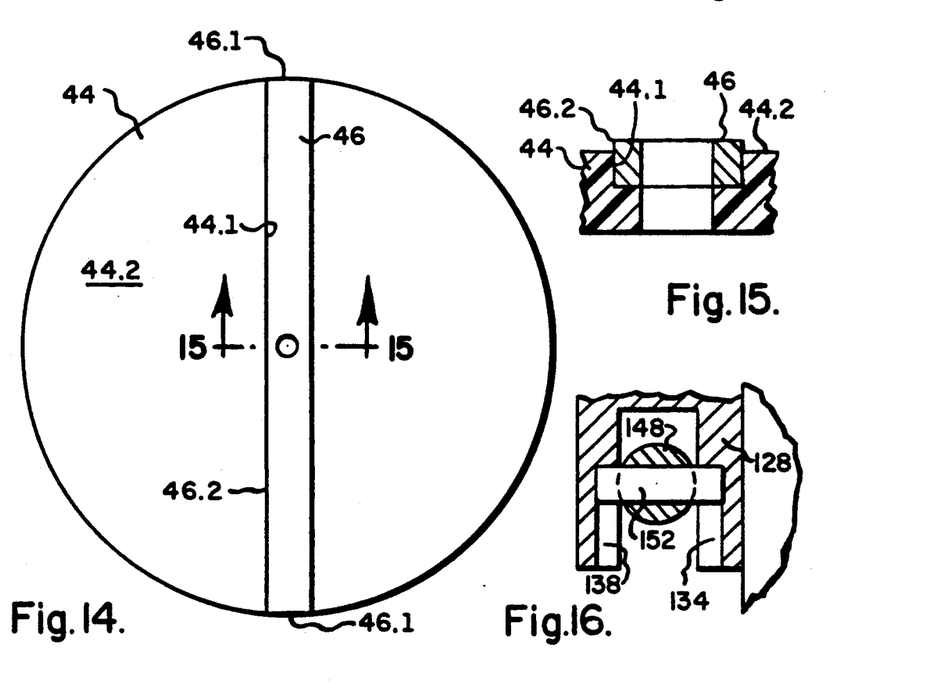
FIG. 14 is a top view of the shredder disk and shredder.
FIG. 15 is a section taken generally along the line 15—15 in FIG. 14.
FIG. 16 is an enlarged detail sectional view taken generally along the line 16—16 in FIG. 9.

The upper surface 44.2 of the shredder disk 44 is provided with a channel 44.1 which passes through the center of the disk 44, the channel being of a rectangular cross section. The shredder 46 is of a mating cross-sectional configuration and is adapted to be received within the channel 44.1 in a snug fit. The length of the shredder is such that its tip 46.1 lies at the periphery of the disk 44. As can best be seen from the FIG. 15 the shredder 46 has a vertical edge surface 46.2 which extends above the upper surface 44.2 of the disk, which vertical edge surface will vary in height from approximately 0.8 millimeters to 4 millimeters. Thus, when carrots are to be shredded a relatively low projecting height of 0.8 millimeters is preferred. However, if apples are to be shredded, it has been found that a height of up to 4 millimeters will give satisfactory results. The shredder disk and the shredder are secured to the drive hub by means of shredder plate knob in the form of a bolt 66 which has a generally triangular structure 68 secured on its upper portion as by welding or the like. The purpose of the triangular portion 68 is to prevent the bridging of material within the hopper.

The Hopper Assembly

The hopper assembly includes a generally rectangular base portion 70 which is provided with laterally outwardly extending flanges 72 adapted to lie upon the upper wall 22. The bottom of the back wall of the rectangular hopper base portion 70 of the hopper is provided three hinge pin receiving portions 74. The hopper base portion is secured to the upper wall 22 by means of right and left hinge pins 76 which pass through the hinge pin receiving portions 74, and also through hinge pin receiving portions 78 of a hinge plate 80 which is bolted or otherwise rigidly secured to the upper plate 22.

The rectangular base portion 70 is provided with a circular aperture in its upper surface 70.1, and a cylindrical canister or hopper 82 is rigidly secured within the aperture by welding or the like. As can best be seen from the FIG. 3, there is a discharge opening gap between the bottom 82.1 of the hopper 82 and the top 44.2 of the disk 44. This discharge opening gap is so sized that it is greater than the height of the vertical edge surface 46.2 but not greater than the thickness of the smallest vegetables or fruit which are to be shred. This will insure that all fruit or vegetables placed within the hopper 82 will be shred by the shredder 46 on disk 44, the shred material being discharged through the gap.

The hopper 82 is closed by a cover 84 which has a generally octagonal configuration. The cover 84 is secured to the hopper 82 by means of a rod 86 which passes through a sleeve 88 welded to the outside of hopper 82. The upper end of the rod 86 is secured to the cover in any conventional manner and preferably by welding. The cover 84 is further provided with a handle 90 and various stops in the form of bolts and acorn nuts 92, 94, respectively. A forwardly extending arm 96 is secured to the lower end of the rod 86 for movement therewith. In addition, a downwardly extending plate 98 is welded to the outer surface of arm 96, the plate carrying at its lower end a magnet 100 which can cooperate with a reed switch 102 mounted on the undersurface of the upper wall 22.

Figures 5, 6:
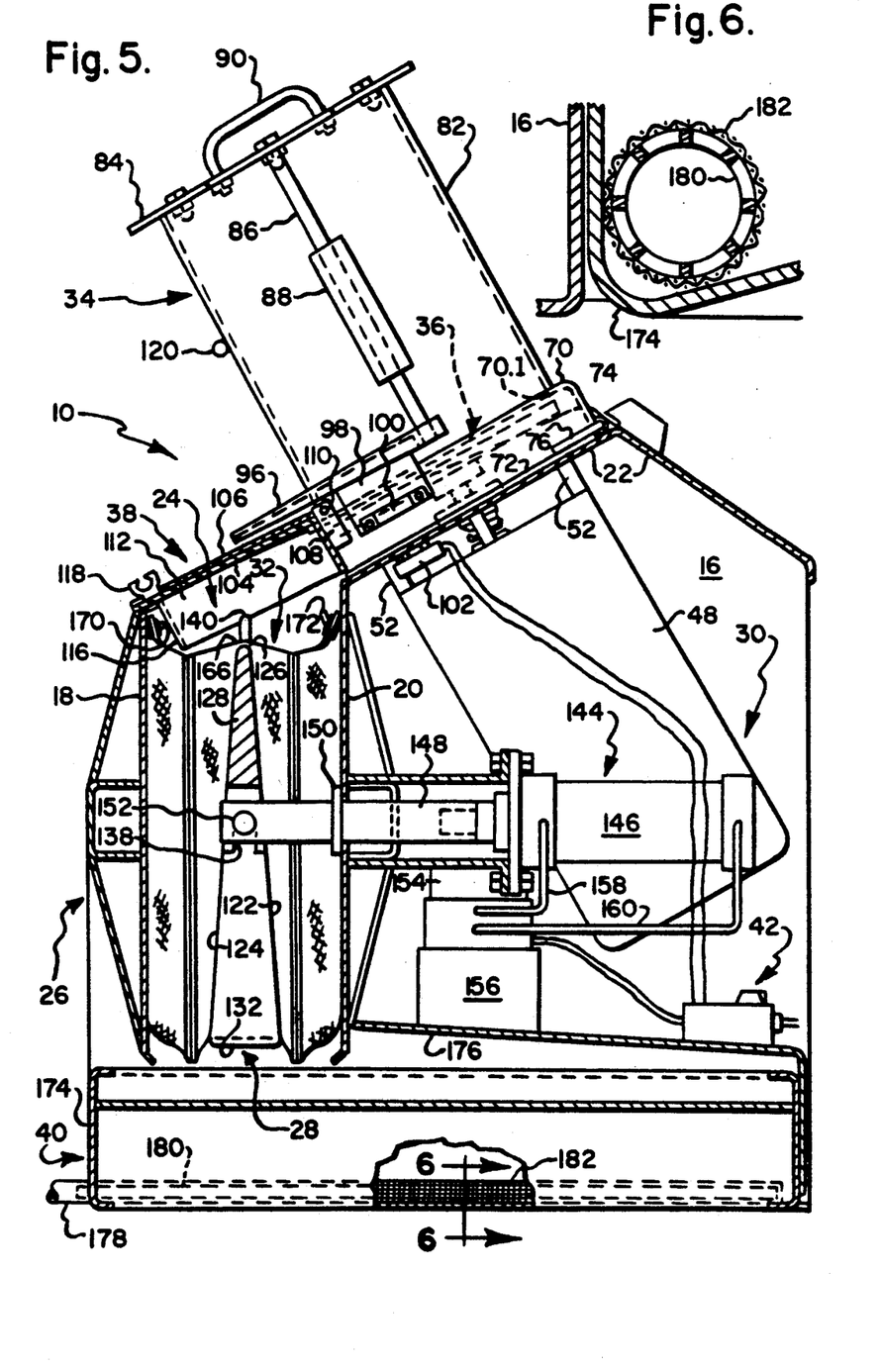
FIG. 5 is an enlarged sectional view taken generally along the line 5—5 in FIG. 2, this view showing the movable platen in an intermediate position.
FIG. 6 is a sectional view taken generally along the line 6—6 in FIG. 5.

While the function of the reed switch 102 will be described in greater detail below, it should be noted that when the parts are in position shown in FIG. 5, the electrical circuit controlled by the reed switch 102 will be in a normally closed condition. However, if the magnet is moved away from the reed switch a slight distance, for example a quarter of an inch, the electrical circuit controlled by the reed switch 102 will be switch to an opened condition.

To load the cylindrical canister or hopper 82 it is necessary to initially lift the cover 90 as the bolts and acorn nuts 94 will prevent rotational movement until this lifting has been accomplished. Once the parts have been lifted, it is then possible to rotate the cover in a counter clockwise direction about the axis of the rod 86 to suitably uncover the canister 82 so that produce can be loaded into the canister. Produce thus loaded into the canister will be supported by the top surface of the shredder disk 44. Any produce ground by the shredder will be impelled through the gap between the lower surface 82.1 and the upper surface 44.2 of the disk 44.

The Press Chamber Cover

The press chamber cover, which has been indicated generally at 38, includes a clear flat generally rectangular plate 104 which is reinforced, or backed, by a metal plate 106, the plastic plate being rigidly secured to the metal plate. The metal plate is provided with a pair of rearwardly extending ears 108 which carry pins 110, which pins are received in suitable apertures in the lower portion 70. Thus, the cover can be moved from its normal closed position to an open position to provide access to the press chamber.

Mounted on the underside of the cover is a discharge chute formed of right and left side walls 112, 114, respectively, and a front side wall 116. Material shredded by the shredder 46 will be slung through the gap between the surface 44.2 and the lower edge of the container 82.1 until it contacts the discharge chute. When it contacts the discharge chute, it will drop into the press chamber 24.

When the hopper cover 84 is in a closed position, it is not possible to open the press chamber cover 38 as arm 96 overlies the cover 38. However, when the hopper cover 84 has been moved to its open position the arm 96 will no longer overlie the cover 38 and it is possible to swing it to the open position where catches 118 and 120 may engage each other to hold the press chamber cover in its open position.

Press Means

Figures 9, 10, 11:
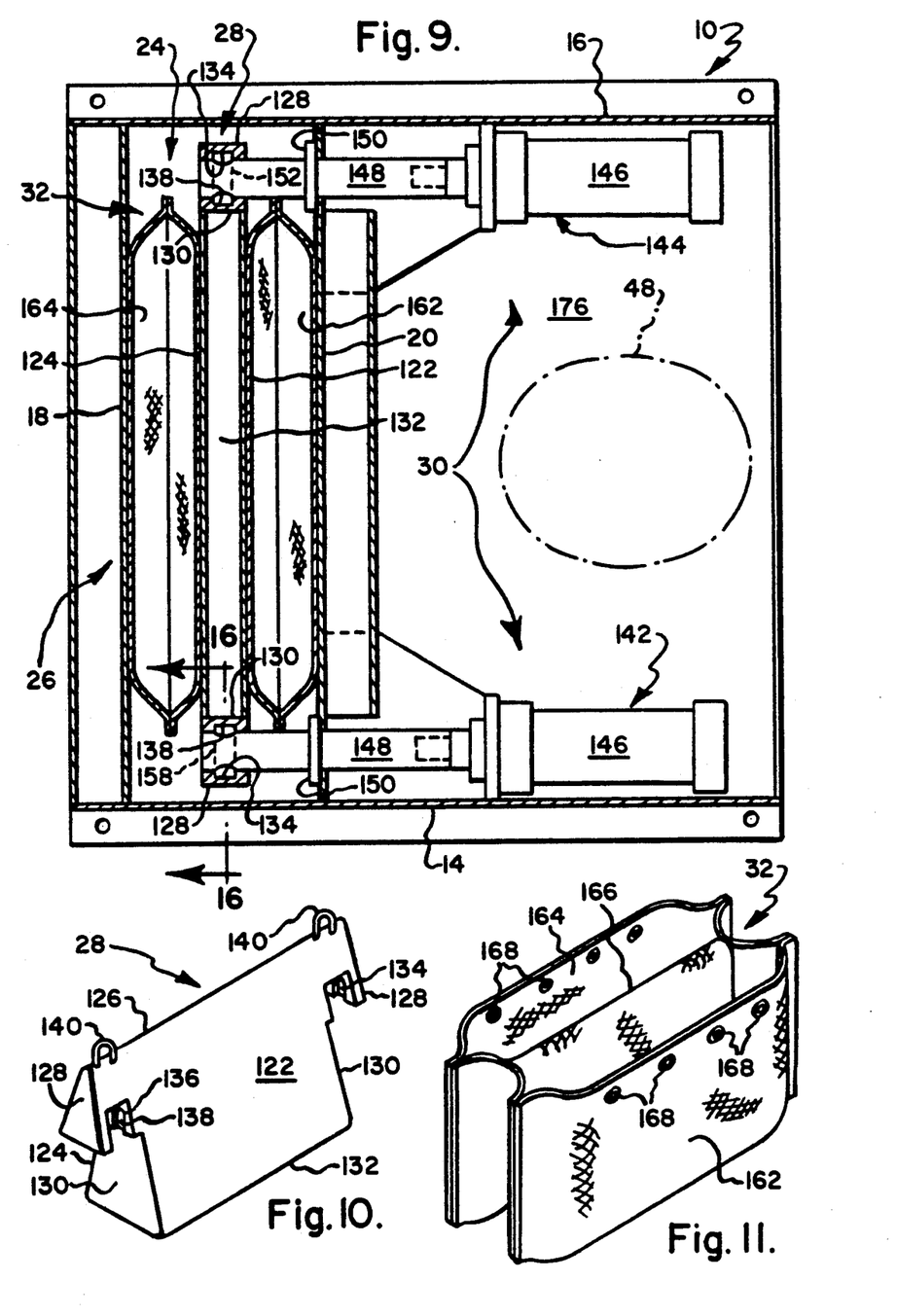
FIG. 9 is an enlarged sectional view taken generally along the line 9—9 in FIG. 1.
FIG. 10 is a perspective view of the movable platen.
FIG. 11 is a perspective view of the filter bag assembly of this invention.

As previously indicated, the press means includes a press chamber and a moveable platen structure mounted within the press chamber. The moveable platen structure 28 is a welded assembly including opposed front and rear side-to-side extending platen plates having press surfaces 122, 124, respectively. The upper edge of plates 122 and 124 are joined together in a rounded surface 126 (FIG. 10). The shape of the platen plate 122 can best be seen from FIG. 10 and it should be appreciated that the platen plate 124 has the same configuration. The upper side edges of the movable platen structure 28 are closed by triangular plates 128, and the lower side edges are closed by frusto-conical plates 130. The bottom of the moveable platen 28 is closed by another plate, shown in phantom at 132 in FIG. 5. As can be seen from FIG. 10, the upper portion of the platen surfaces or plates 122 and 124 form a pair of upper laterally outwardly extending portions. Each of these portions is provided with spaced apart pairs of inverted saddle brackets. Thus, the inner surface of each of the triangular plates 128 is suitably machined to provide an inverted saddle bracket 134. Spaced opposite the inverted saddle bracket 134 is a further plate 136 above the frusto-conical plate 130, the plate 136 also being provided with an inverted saddle bracket 138.

Finally, the moveable platen is provided with a pair of hooks or eyes 140 mounted on the top surface 126 to facilitate the removal of the moveable platen from the press chamber.

The Platen Moving Means

The platen moving means consists essentially of right and left double acting hydraulic cylinder assemblies 142, 144, respectively. Each of the cylinder assemblies 142, 144 is mounted below the upper wall 22 and behind the platen wall 20, the cylinder assemblies being interconnected with the reinforcing structure (no number) for the platen wall 20. Each of the cylinder assemblies includes a hydraulic cylinder 146, a piston (not shown) within the cylinder 146, and an extensible and retractable piston rod 148. Each rod 148 passes through a rod bearing or seal 150 mounting on the intermediate platen wall 20. Each end of each piston rod is provided with laterally outwardly extending trunnions which may in fact be formed from a single trunnion pin 152 extending through a suitable aperture in the end of the piston rod 148. As can best be seen from FIG. 16, the trunnion pin 152 is adapted to be received within the inverted saddle bracket 134 and 138. Thus, when the moveable platen structure is mounted in the manner indicated in FIGS. 5 and 9, it will be free to pivot about the pin 152. This can be appreciated from a comparison FIGS. 5, 12, and 13.

The hydraulic cylinder assemblies are powered by a pump 154 mounted upon a suitable hydraulic reservoir 156. The pump can deliver hydraulic fluid through valves (not shown) and hydraulic lines 158 to 160 to the opposite ends of the hydraulic cylinders 146. Hydraulically, the two cylinders are plumbed parallel to each other, and one may move without corresponding movement of the other. However, as the rods are interconnected with the movable platen structure 28, and as the tolerances between pins 152 and the saddles 134 and 138 are fairly close, one rod will not advance or retract appreciably more than the other. The operation of the pump 156 and of the valves for directing hydraulic fluid is under the control of the controller 42 and its operation will be more fully described below.

Filter Bag Assembly

The filter bag assembly used with the press of this invention is in the form of a saddle bag. The filter bag assembly is best shown in FIG. 11, and includes a first front pulp receiving pocket 162 and a second rear pulp receiving pocket 164. The filter bag assembly is made from an appropriate filter fabric which is sewn together. An intermediate saddle portion 166 extends between the two pockets, the saddle portion overlying the upper surface 126 of the moveable platen structure when the bag assembly is installed. To mount the filter bag assembly, each pocket is provided with a plurality of horizontally aligned apertures in that side remote from the saddle portion 166. Thus, the front wall of the front pocket 162 is provided with apertures 168 and similarly the rear wall of the rear pocket 164 is also provided with apertures 168. These apertures are adapted to be placed over hooks in the press chamber. Thus, the front platen wall is provided with a plurality of horizontally aligned spaced apart hooks 170 on its upper surface. Similarly, the rear platen wall 20 is provided with horizontally aligned spaced apart hooks 172. The bag is simply mounted by placing the hooks 170 and 172 in the appropriate apertures, the intermediate portion 166 of the bag being disposed over the saddle portion 126 of the intermediate moveable platen.

Filter Assembly

During the operation of the compact juice machine juice will be pressed from the pulp delivered to the filter bag assembly 32. The juice will flow through the open bottom of the press chamber into a filter assembly indicated generally at 40. The filter assembly includes a generally rectangular juice receiving receptacle 174, the juice receiving receptacle being disposed below the bottom wall 176 of the motor compartment of the frame as well as the press chamber 174. The receptacle is supported in such a manner that it can be slid forwardly out of the machine for cleaning. Adjacent to the bottom wall of the receptacle of 174 is a generally circular outlet to which a discharge spigot 178 is connected. A generally cylindrical support 180 is provided through which juices can flow, the cylindrical support being so dimensioned that its forward end can be telescoped into the circular outlet in the bottom of the juice receiving receptacle 174. A filter sock 182 is adapted to be slid over that portion of the cylindrical support which is not telescoped within the circular outlet. When the parts are in their assembled position, as shown in FIGS. 5 and 6, any pulp which comes through with the juices will be further filtered from the juices to be discharged through the spigot by means of the filter sock.

Operation

To operate the compact juice machine of this invention it is necessary to initially plug it in to an 15 amp. 110 to 120 volt outlet. The container or hopper 82 is loaded with fruit or vegetables which are to be converted into juices. To this end, the hopper cover 84 is initially lifted up by engaging the handle 90 and pulling it upwardly and then rotating the hopper cover about the axis of the rod 84. When this happens, the magnet 100 will move away from the reed switch 102 preventing operation of the motor 48 and pump 154. Then the produce which is to be shredded is placed in the hopper and the hopper is closed, bringing the parts back to the position shown in FIG. 5. When the parts are in this position, it is necessary only to engage the start and stop button 184 to commence operation of both the motor 48 and the pump 154. During operation, the motor will continuously rotate and the pump, through the various valves and under the control of the controller 42, will cause the piston rods 148 to move first in one direction at a prescribed speed until the moveable platen 28 has completed its movement in that direction, to hold the platen in that position for a prescribed period of time, to then reverse the movement of the moveable platen until it reaches the other position, to hold it in that position for a predetermined length of time, and to repeat the process. While the pressing sequence is taking place, the shredder motor will continue to operate. In the event that all the material within the hopper is discharged, it is necessary only to lift up the top of the hopper to reload the machine, this lifting immediately stopping the rotation of the shredder motor and stopping the operation of the press as the electric circuit will be opened by the reed switch 102. The foregoing operation will continue until the filter bag assembly 32 becomes so full of pomace that it needs to be emptied. When this occurs, the mechanical interlock 96 will be moved to its alternate position by again raising and swinging the hopper cover, at which time the cover for the press chamber can be moved upwardly in the direction by the arrow 186 in FIG. 3. After the full filter bag is removed, an empty bag is inserted, and it is necessary only to close the covers 38 and 84 to again commence operation. Juice that is being expressed from the pulp will of course flow into the receptacle 174 and should be drained into appropriate containers below spigot 178.

Figure 12:
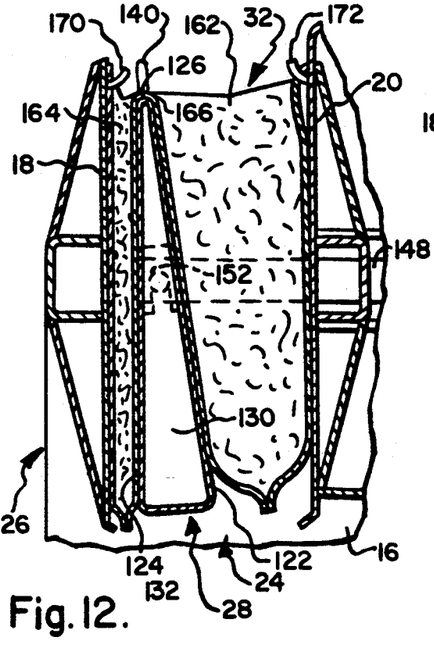
FIGS. 12 and 13 illustrate two cycles of pressing, the moveable platen being shown in its full forward position at the completion of one pressing cycle in FIG. 12 and being shown in its full rearward position at the completion of the following press cycle in FIG. 13.
Figure 13:
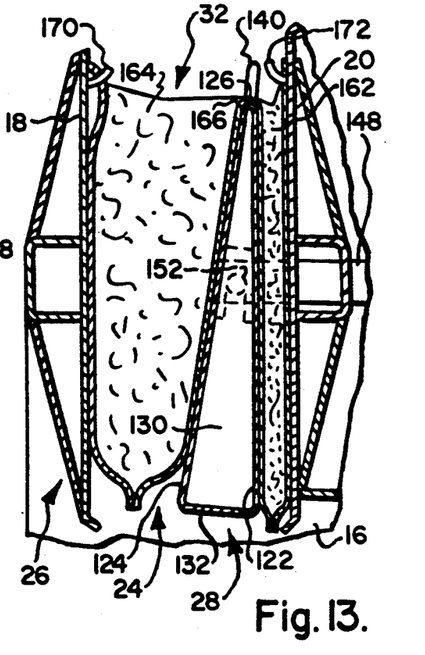

The controller 42 is preferably set in such a manner that the press stroke from one position, for example the position shown in FIG. 12, to another position, for example that shown in FIG. 13, will take approximately 45 seconds. The controller also preferably holds the moveable platen against the fixed platen at the completion of the stroke approximately 40 seconds to let the fluid drain through the press cake. The operation will continue in a back and forth sequence until the hopper cover 84 is again lifted. This will immediately stop the movement of the cylinders and also stop the rotation of the motor. However, when the top 84 is again closed, completing the circuit through the reed switch 102, the press time cycle will continue without resetting to zero. However, if the on/off switch 184 is used to stop the movement, the operation of the cylinders will then be in the reverse direction. This feature facilitates removal of the press bag when necessary.

As previously indicated, those materials which come into contact with foods are all made of an appropriate grade of stainless steel which will meet the requirements of the National Sanitation Foundation. Also, the machine can be readily cleaned as it is a simple matter to remove the parts for cleaning without the use of any tools. The particular machine described above operates continuously, except when it is necessary to refill the hopper. Thus, while one chamber is being pressed, another chamber is being opened for the reception of new material.

It should be obvious from the foregoing detailed description that the present invention has achieved its design objectives in being a compact machine which can be operated with a standard electrical power outlet, and which will be easy to clean. Because two open top press bags are utilized in alternating pressing sequences, it is possible to continuously shred during pressing. The present shredder has been found to be insensitive to feeding speeds and is satisfactory for a wide variety of produce. However, for relatively hard produce, such as carrots, it is desirable that the shredder have a cutting edge of only approximately of 0.8 millimeters high. Cutting edges up to 4 millimeters are satisfactory for softer produce. Soft produce, such as apples, can be shredded with hard produce, such as carrots, provided that a shredder is used which will satisfactorily shred the hardest produce in the hopper. In view of the simplicity of design, the above machine is very rugged.

While a preferred form of the present invention has been illustrated and described above, it should be obvious that other forms of this invention may occur to those having ordinary skill in the art. Therefore applicant does not intend to be limited by the specific embodiment described above, but intends to be limited only by the breadth of the following claims.

What is claimed is:

1. A compact juice machine capable of shredding fruits or vegetables, pressing the shred pulp to extract juice therefrom, and filtering the extracted juice, the apparatus comprising:

a hopper;

shredder means in communication with the hopper for shredding vegetable or fruit received from the hopper;

press means capable of continuously pressing the vegetable or fruit pulp received from the shredder means, the press means including a press chamber having two spaced apart generally vertically extending platen walls, and a pair of fixed side walls extending between the platen walls, a movable platen structure disposed within the press chamber between the fixed platens and the side walls, the movable platen structure including opposed side to side extending platen surfaces and an upper surface extending between the opposed platen surfaces, platen moving means for reciprocating the movable platen structure towards and away from the platen walls of the press chamber, and a filter bag assembly having first and second spaced apart pulp receiving pockets and an intermediate saddle portion capable of being supported by the upper surface of the movable platen, each pocket being disposable between a fixed platen surface of the press chamber and an associated platen surface of the movable platen structure; and filter means disposed below the press means for filtering juice from any large size pieces of pulp which may have been discharged with the juice from the press means.

2. The compact juice machine as set forth in claim 1 wherein the hopper has an open bottom, and wherein the shredder means includes a rotatable shredder disk having an upper surface onto which vegetables or fruit may be received from the open bottom of the hopper, a shredder mounted on the disk, the shredder having a generally vertically extending edge surface extending upwardly above the upper surface of the shredder disk approximately 0.8 to 4 mm, and drive means for rotating the shredder disk at such a rotational speed as to impart a shredder tip speed of between 40 and 70 mph, a discharge opening being disposed between the top surface of the shredder disk and the bottom of the hopper, which opening is at least as great as the height of the vertically extending edge surface of the shredder element above the upper surface of the shredder disk, but not greater than the thickness of the smallest vegetables or fruit to be grated.

3. The compact juice machine as set forth in claim 2 wherein the shredder disk is provided with a channel in its upper surface, the shredder being formed from rectangular bar stock mounted within the channel.

4. The compact juice machine as set forth in claim 2 wherein the shredder disk is connected to the drive means by bolt means, the bolt means including a generally triangular shaped structure mounted on an upper portion thereof which will rotate with the disk to prevent bridging of the material.

5. The compact juice machine as set forth in claim 1 wherein the filter means includes a juice receiving receptacle having an outlet at the bottom of the receptacle, the outlet being circular in cross-section, a generally cylindrical support through which juices may flow, and a filter sock which may be pulled over the generally cylindrical support from one end to the other, the parts being so arranged and constructed that one end of the support may be partially inserted into the outlet at the bottom of the receptacle with a substantial portion of the support and the filter sock being disposed within the juice receiving receptacle.

6. The compact juice machine as set forth in claim 1 wherein the movable platen structure includes a pair of upper laterally outwardly extending portions, and wherein the platen moving means include a pair of spaced apart extensible and retractable rods, ends of the rods supporting the pair of upper laterally outwardly extending portions.

7. The compact juice machine as set forth in claim 6 in which the movable platen has a generally triangular cross section.

8. The compact juice machine as set forth in claim 6 wherein each of the pair of rods is a portion of a hydraulic cylinder assembly including a cylinder mounted to one side of a platen wall, the rod of each cylinder assembly extending through the platen wall.

9. The compact juice machine as set forth in claim 6 wherein the laterally outwardly extending portions of the movable platen are spaced apart inverted pairs of saddle brackets, each rod having a pair of spaced apart trunnions which can be disposed within a pair of the inverted saddle brackets to support the movable platen.

10. The compact juice machine as set forth in claim 1 wherein each of the two spaced apart fixed platen walls is provided with a plurality of horizontally aligned spaced apart hooks, and wherein a side of each of the pulp receiving pockets of the filter bag remote from the intermediate saddle portion is provided with hook receiving apertures for receiving the spaced apart hooks whereby the sides of the pockets may be supported on the fixed platen walls.

11. A compact juice machine which may be mounted on a mobile stand for movement between locations in a retail establishment and which may be powered from a grounded 115 v. 15 A. circuit; the juice machine comprising:
- a frame including a pair of opposed generally vertically extending sidewalls, front and intermediate generally vertically extending fixed platen walls extending between the sidewalls, the forward portion of the sidewalls and the fixed platen walls defining a press chamber, and an upper wall extending between the sidewalls to the rear of the intermediate platen;
- a shredder assembly including a rotatable shredder disk carried for rotation above the upper wall, and a drive motor mounted below the upper wall, the motor having a drive shaft which extends through a bearing seal in the upper wall for driving the shredder disk;
- a hopper mounted on the upper wall above the shredder disk;
- a cover extending above the press chamber, the cover being provided with a discharge chute on its lower surface to direct shredded material from the shredder disk to the press chamber;
- a pair of hydraulic cylinder assemblies mounted below the upper wall of the frame, each of which includes a rod which extends through a rod bearing and seal in the intermediate platen wall;
- a movable platen structure disposed within the press chamber, the structure being secured to the ends of the rods for movement therewith, the movable platen structure including opposed side to side extending platen surfaces and an upper surface extending between the opposed platen surfaces;
- a filter assembly carried by the frame below the press chamber for filtering juice from any large size pieces of pulp which may have been discharged with the juice from the press means; and
- control means mounted within the frame for controlling the operation of the cylinder assemblies during operation of the shredder.

12. The compact juice machine as set forth in claim 11 wherein the hopper is hinged to the upper wall in such a manner that the hopper can be tilted to an inoperative position to provide access to the shredder disk for servicing and cleaning.

13. The compact juice machine as set forth in claim 12 wherein the hopper carries a safety interlock means for causing the shredder to stop operating when the hopper is tilted back.

14. The compact juice machine as set forth in claim 11 wherein a filter bag assembly is provided having first and second spaced apart pulp receiving pockets and an intermediate saddle portion capable of being supported by the upper surface of the movable platen, each pocket being disposable between a fixed platen surface of the press chamber and an associated platen surface of the movable platen structure.

15. The compact juice machine as set forth in claim 11 wherein the cover is hinged to a lower portion of the hopper so that it may be moved between its normal closed position to an open position to provide access to the filter bag.

16. The compact juice machine as set forth in claim 15 wherein a mechanical interlock means is provided for preventing the cover from being swung to its open position except when the mechanical interlock means is moved from its normal cover closed position to an cover open position, the mechanical interlock means cooperation with an electrical switch so that when the mechanical interlock means is moved to its cover open position the electrical switch will open to cause the machine to cease to operate.

* * * * *